May 14, 1929.  E. F. SCHERMERHORN  1,713,401
CONSTRUCTION FOR INSULATED RAIL JOINTS
Filed Oct. 29, 1928
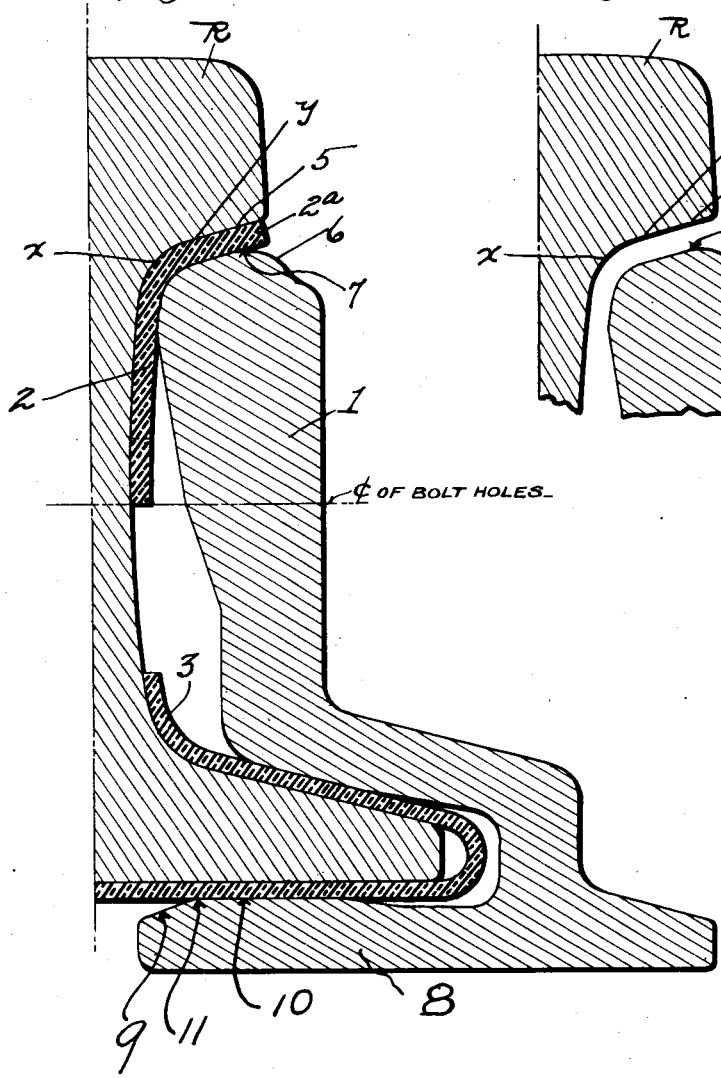
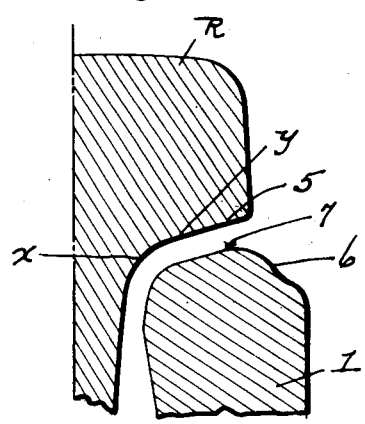
Inventor
E. F. Schermerhorn, Patented May 14, 1929.

1,713,401

UNITED STATES PATENT OFFICE.

EDWARDS F. SCHERMERHORN, OF BROOKLYN, NEW YORK, ASSIGNOR TO THE RAIL JOINT COMPANY, OF NEW YORK, N. Y., A CORPORATION OF NEW YORK.

CONSTRUCTION FOR INSULATED RAIL JOINTS.

Application filed October 29, 1928. Serial No. 315,727.

This invention relates to the subject of insulated rail joints employed in railway tracks in connection with the signal circuits, and primarily has for its object a structural improvement which better maintains the full insulating value of the head insulation of an insulated rail joint and protects such part of the insulation at the location where quickest deterioration and failure usually take place.

An insulated rail joint is usually the cause of apprehension on the part of the railroads because of the highly responsible duty imposed on such joints in track signal circuits, and in that connection the matter of protecting and preserving the insulation, in a way to maintain its full insulating value, is of prime importance, entirely aside from the desirability of avoiding the necessity for frequent renewals due to early deterioration by excessive wear or to failure due to undesirable concentration of load and wear at a particular location. These factors are taken into consideration in the present invention, and it is therefore the particular object of the present invention to provide an improvement in the design of an insulated joint bar whereby the head insulation will be so engaged by the head of the bar that the load and wear are prevented from concentrating upon the outer edge portion of such insulation so that the wheel loads will mainly pass through the head fillet of the rail thereby entirely relieving the outer edge portion of the head insulation from a concentration of the load, while at the same time maintaining a bearing surface for the joint bar not only in the head fillet of the rail but under the inner portion of the head fishing surface. This accomplishes the desired result of insuring greater life to the insulation under the head of the rail and minimizing the danger of failure in the signal circuit due to a failure of the head insulation of the joint.

The invention consists in the novel features and coordination of elements herein described and claimed, and while susceptible of structural change without departing from the spirit or scope of the invention, a practical arrangement thereof is shown in the accompanying drawings, in which:—

Figure 1 is a sectional view of a well-known type of continuous insulated rail joint embodying the improvement claimed.

Figure 2 is a detail view of the improvement, showing a different section of the bar.

The present invention does not contemplate any special change in the form or design of the head or base insulation of the rail joint, which in general include the rail R, the joint bar 1, the head and base insulation 2 and 3 respectively, and the usual joint bolts (not shown) with the necessary bolt insulation. The insulation elements referred to may be of the commonly used and approved fibre pieces to provide the necessary insulation for the head and base portions of the rail, but the head insulation is preferably of the common angle formation having the upper flange $2^a$ fitting the underside of the rail head and extending to the outer bottom corner of the rail head as clearly shown in the drawings.

As is well known the outer edge portion of the upper flange of the head insulation, underlying the rail head, and fitting the rail head fillet at $x$ is subjected to concentration of load and wear, which has a very damaging effect upon this part of the insulation because the usual joint bar, with its comparatively sharp upper outer corner, has a pinching engagement therewith and becomes a cutting anvil upon which the edge portion of the head insulation quickly becomes damaged, especially if there is any tendency of the joint bar to "cock" inwardly upon the tightening of the bolts. Where this tendency is present, as frequently occurs, the extreme bearing on the fibre is obtained upon the sharp upper outer corner of the joint bar with the consequence that the fibre head piece always begins to cut out at this outer edge portion, and this cutting action is gradually transferred inwardly toward the rail web. The effect of this is successively to cut off narrow portions of the insulation on account of the bearing of the joint bar being limited to a slight area. Also wear at this point is aggravated by a deflection of the side of the rail head under load.

It is the purpose of the present invention to avoid the excessive wear of the head insulation at the location referred to and aid in distributing the insulation bearing for the bar along the entire upper head of the bar. It has been found that this can be successfully accomplished with all of the attendant advantages specified by re-designing the joint bar so that its upper outer corner, as at 6, will be made on a large radius so that the said upper outer corner of the joint bar will extend inwardly and well beneath the outer edge portion of the head insulation to a point as at 7 so that the wheel loads must be transferred to the insulation through the head fillet of the rail at $x$ and through the inner portion $y$ of the underside of the rail head at a distance inwardly from the outer side of the rail head. By thus limiting the loading engagement of the insulation to the rail portions $x$ and $y$ it leaves the outer edge portion of the head insulation entirely free from concentration of wheel loads, as well as from wear from the action of the head of the bar. At the same time the head insulation of the joint is preserved intact along the underside of the rail head, so that the full insulation value of the joint is maintained, and the life of the insulation greatly increased.

For the further protection of the insulation of the joint the present invention also contemplates an improvement in the base member 8 of the continuous-type joint bar. To that end the new construction of the bar involves truncation of the upper inner corner of the said base member at 9, the said truncated or cut-away portion 9 joining the flat upper bearing surface 10 of the base member by a well-rounded fillet 11. This formation at the upper inner corner of the base member 8 entirely relieves or frees such corner portion from the base part of the insulation 3 and the fillet 11 having a smooth well-rounded engagement with said insulation prevents cutting at that point.

I claim:—

1. An insulated rail joint including the rail, a head insulation arranged at the underside of the rail head, and a joint bar having an upper truncated outer corner portion providing a clearance between the bar and the under outer edge portion of the head insulation and providing a bearing engagement with the latter at a distance inwardly from the outer edge of such insulation.

2. An insulated rail joint including the rail, base insulation fitting the flange of the rail and underlying the bottom of the latter, and a joint bar having a base member extending beneath the insulation at the bottom of the rail and provided with a truncated or cut-way inner upper corner and a bearing fillet joining the truncation with the upper flat bearing surface of the said base member.

In testimony whereof I hereunto affix my signature.

EDWARDS F. SCHERMERHORN.